US010996360B2

(12) United States Patent
Etgen

(10) Patent No.: US 10,996,360 B2
(45) Date of Patent: May 4, 2021

(54) SYSTEM AND METHOD FOR CORRECTION OF RECEIVER CLOCK DRIFT

(71) Applicant: BP Corporation North America, Inc., Houston, TX (US)

(72) Inventor: John Theodore Etgen, Houston, TX (US)

(73) Assignee: BP CORPORATION NORTH AMERICA, INC., Houston, TX (US)

( * ) Notice: Subject to any disclaimer, the term of this patent is extended or adjusted under 35 U.S.C. 154(b) by 495 days.

(21) Appl. No.: 15/781,472

(22) PCT Filed: Dec. 5, 2016

(86) PCT No.: PCT/US2016/064891
§ 371 (c)(1),
(2) Date: Jun. 4, 2018

(87) PCT Pub. No.: WO2017/105885
PCT Pub. Date: Jun. 22, 2017

(65) Prior Publication Data
US 2020/0264330 A1 Aug. 20, 2020

Related U.S. Application Data

(60) Provisional application No. 62/319,860, filed on Apr. 8, 2016, provisional application No. 62/269,459, filed on Dec. 18, 2015.

(51) Int. Cl.
*G01V 1/36* (2006.01)
*G01V 1/00* (2006.01)
(52) U.S. Cl.
CPC ............. *G01V 1/36* (2013.01); *G01V 1/008* (2013.01); *G01V 2200/12* (2013.01)

(58) Field of Classification Search
None
See application file for complete search history.

(56) References Cited

U.S. PATENT DOCUMENTS

2011/0019502 A1   1/2011   Eick et al.
2011/0273958 A1   11/2011  Kia et al.
(Continued)

FOREIGN PATENT DOCUMENTS

EP   2507653 A2    10/2012
WO   2008/025986 A1  3/2008
(Continued)

OTHER PUBLICATIONS

PCT/US2016/064891 International Search Report and Written Opinion dated Mar. 3, 2017 (14 p.).

*Primary Examiner* — Lina M Cordero
*Assistant Examiner* — Brandon J Becker
(74) *Attorney, Agent, or Firm* — Conley Rose, P.C.

(57) ABSTRACT

According to one embodiment, there is provided a method of correcting recorded seismic data where each receiver clock is potentially inaccurate. Since the seismic wave field is not random, and contains coherent events that are recorded by all receivers in a local area, it is possible to estimate the differences in the time reference by comparing the recordings of different receivers in a local area. With no external time reference, time signal, or pilot trace, an entire seismic data itself can be used to determine how each receiver's clock is drifting from true time.

19 Claims, 11 Drawing Sheets

(56) References Cited

U.S. PATENT DOCUMENTS

| | | | |
|---|---|---|---|
| 2011/0317521 A1* | 12/2011 | Dragoset, Jr. | G01V 1/28 |
| | | | 367/53 |
| 2012/0287753 A1* | 11/2012 | Hatchell | G01V 1/38 |
| | | | 367/21 |
| 2014/0297191 A1* | 10/2014 | Svay | G01V 1/34 |
| | | | 702/16 |
| 2014/0362658 A1* | 12/2014 | Poole | G01V 1/36 |
| | | | 367/7 |
| 2015/0168576 A1 | 6/2015 | Craft et al. | |
| 2016/0018544 A1* | 1/2016 | Eick | G01V 1/364 |
| | | | 367/21 |
| 2016/0047929 A1* | 2/2016 | Hegna | G01V 1/38 |
| | | | 367/24 |
| 2016/0109595 A1* | 4/2016 | Stork | G01V 1/003 |
| | | | 367/46 |
| 2016/0161619 A1* | 6/2016 | Holschuh | G01V 1/303 |
| | | | 702/18 |
| 2016/0377755 A1* | 12/2016 | Etgen | G01V 1/301 |
| | | | 702/16 |

FOREIGN PATENT DOCUMENTS

| | | |
|---|---|---|
| WO | 2011/068922 A2 | 6/2011 |
| WO | 2015050874 A2 | 4/2015 |

\* cited by examiner

SYSTEM AND METHOD FOR CORRECTION OF RECEIVER CLOCK DRIFT

CROSS-REFERENCE TO RELATED APPLICATIONS

This application is a 35 U.S.C. § 371 national stage application of PCT/US2016/064891 filed Dec. 5, 2016, and entitled "System and Method for Correction of Receiver Clock Drift," which claims the benefit of U.S. provisional patent application Ser. No. 62/269,459 filed Dec. 18, 2015, and entitled "System and Method for Correction of Receiver Clock Drift," and U.S. provisional patent application Ser. No. 62/319,860 filed Apr. 8, 2016, and entitled "System and Method for Correction of Receiver Clock Drift," each of which are hereby incorporated herein by reference in their entirety for all purposes.

STATEMENT REGARDING FEDERALLY SPONSORED RESEARCH OR DEVELOPMENT

Not applicable.

TECHNICAL FIELD

This disclosure relates to the general subject of seismic exploration and, in particular, to methods of correcting for time drifts in clocks used in seismic receivers. Seismic exploration may be used to investigate a region of the subsurface of the earth for example to discover, assess and monitor changes over time in hydrocarbons within the subsurface.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns or vibrators in marine environments. During a seismic survey, the energy source is placed at various locations near the surface of the earth above a geologic structure of interest. Each time the source is activated, it generates a seismic signal that travels downward through the earth. "Echoes" of that signal are then recorded by seismic receivers at a great many locations, such as on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths are 5-16 seconds, which corresponds to 2500-8000 samples at a 2-millisecond interval. Conventionally each trace records one seismic source activation, so there is one trace for each live source location-receiver activation. In some instances, multiple physical sources might be activated simultaneously but the composite source signal will be referred to as a "source" herein, whether generated by one or many physical sources.

In a typical 2-D survey, there will usually be several tens of thousands of traces, whereas in a 3-D survey the number of individual traces may run into the multiple millions of traces.

In certain survey designs, the receivers can be operated to record continuously, as might be the case where there are multiple seismic sources operating independently in the same recording area. Each source can emit its signal, potentially without co-ordination with the other sources, such that the recorded reflections may overlap. The receivers therefore record continuously, in order to capture all of the reflections. Accordingly, each receiver produces a single trace which is a continuous stream of data comprising the recorded reflections of several (most likely very many) source signals. The traces may be recorded in a memory of the receivers or may be transmitted to a data collection unit separate from the receivers.

It is well known to conduct seismic surveys on land as well as in marine environments. In marine environments, it is sometimes advantageous to utilize receivers that have been placed on the ocean bottom. In this sort of seismic survey, the seismic receivers, also called ocean bottom seismometers ("OBS"), are typically placed at predetermined ocean bottom locations by either releasing them above the target location and letting them sink to the bottom or placing them on the ocean floor through the use of a remotely operated underwater vehicle ("ROV"). An OBS can be a self-contained data-acquisition system that records seismic data generated by active sources such as airguns, as well as signals generated by passive seismic sources such as earthquakes, buoys, etc.

Seismic receivers are typically manufactured to be highly accurate since the oil and gas industry places significant value on high quality seismic data. For example, it is conventional to record the time at which the reflections reach each seismic receiver with a high degree of accuracy. For this reason, seismic receivers are typically provided with a highly accurate internal clock. In general terms, an accurate clock can be said to be one which drifts by less than one sample, over the length of the survey. As an example, for a 30 day survey using receivers which sample every 4 ms, a clock which drifts up to about 0.00013 seconds per day could be said to be accurate. As another example, for a 60 day survey using receivers which sample every 2 ms, a clock would need to drift by less than about $3.3 \times 10^{-5}$ seconds per day to be deemed an accurate clock for the survey.

Examples of accurate clocks are clocks which can receive radio timing signals, such as GPS timing signals, atomic clocks and oven controlled clocks. Such clocks can be expensive, can involve bulky components and can require a relatively large amount of power, which in turn drives the need for a large and therefore bulky battery.

In some marine seismic surveys, the internal clock of an OBS device cannot be synchronized in real time with radio timing signals. In these cases, the drift of a clock is corrected using the travel times of direct arrivals through the water layer, since the velocity of the signal through the water column and the position of the OBS device are known.

Other prior art methods for synchronising clocks require the emission of specific timing signals, either electronic or acoustic, that provide an absolute time reference. In remote areas, these solutions may not be practical.

In recent years, there has been interest in conducting seismic surveys using an order of magnitude more sensors than is conventionally done. For example, current seismic surveys using receivers connected together through cables may use up to 100,000 receivers; surveys using cable-less receivers can involve up to 10,000 receivers. The capital cost associated with using one or two orders of magnitude more receivers, such as 500,000 or 1,000,000 receivers, and the complications of handling such numbers of receivers in the field, presents a very real barrier to conducting such surveys.

The invention has been made with these points in mind.

Before proceeding to a detailed description, however, it should be noted and remembered that the description which follows, together with the accompanying drawings, should not be construed as being limited to the examples (or embodiments) shown and described. This is so because those skilled in the art will be able to devise other variations within the ambit of the appended claims.

SUMMARY

According to a first aspect, there is provided a method for use in seismic exploration of a region of the subsurface of the earth, wherein is provided a plurality of continuously recorded seismic traces collected in a seismic survey conducted proximate to the region of the subsurface of the earth, each of said traces being recorded by a receiver having a clock, the method comprising the steps of:

(a) identifying a plurality of proximate trace pairs, each proximate trace pair comprising a first trace recorded by a first receiver and a second trace recorded by a second receiver proximate to said first receiver;

(b) for each of said proximate trace pairs, determining a relative time shift between said first trace and said second trace;

(c) inverting said relative time shifts determined in step (b) to obtain a clock drift estimate for each of the clocks of said first and second receivers; and (d) using said clock drift estimates obtained in step (c) to time correct the first and second traces of each proximate trace pair, thereby forming a plurality of time-corrected seismic traces representative of the subsurface of the earth.

A seismic trace is the data recorded by a seismic recorder. By continuously recorded seismic trace, it is meant a single seismic trace which records the reflections from several seismic source activations. The recorder may record data for long durations of a survey, possibly the whole survey. In other words, the recorders are not switched on and off to coincide with individual seismic source activations.

By proximate to said first receiver, it is meant that the second receiver was located proximate to the first receiver during the seismic survey which gathered the continuously recorded seismic traces. This is discussed in more detail below.

Step (c) therefore produces a clock drift estimate for each clock being corrected. The clock drift estimate is an absolute value which can be applied to the trace recorded by the corresponding receiver.

The inventors have recognized that the present invention permits the removal of the requirement for an accurate clock in the receiver, which can significantly reduce the manufacturing cost, size and weight of a seismic receiver. Instead, embodiments of the invention are used to correct the clock drift of a relatively inaccurate clock in a seismic receiver. By inaccurate clock, it is meant one which drifts by more than one sample over the course of the survey. It will be understood by the skilled reader that one sample over the course of the survey equates to an amount of drift per day which depends on the length of the survey and the sample rate. For example, for a 30 day survey using receivers which sample every 4 ms, a clock which drifts by more than about 0.00013 seconds per day could be said to be inaccurate. As another example, for a 60 day survey using receivers which sample every 2 ms, a clock which drifts by more than about $3.3 \times 10^{-5}$ seconds per day would be deemed to be an inaccurate clock for the survey.

According to one embodiment seismic data that is recorded by the receivers as part of the seismic acquisition survey will be used to estimate and remove the clock drift in each receiver. Since seismic data are not random, and contain coherent events that are recorded by all receivers in a local area, according to one embodiment it is possible to compare the arrival times of these events, which should be locally coherent, to estimate how a clock is drifting compared to other clocks in other receivers in the area. For example, the relative time shift in step (b) may comprise calculating a cross correlation between said first and second traces. The maxima of those cross correlations are then used to estimate the drift difference of the clock in the selected receiver from true time. As an alternative to cross correlation, other techniques for identifying the same signal in two different traces, and particularly for identifying what shift in two traces would achieve maximum similarity between the two traces, may be used. For example, dynamic image warping, a correlated leakage method or the Monte Carlo method may be used to identify what shift would achieve maximum similarity between two traces, thereby generating an estimate of the relative time shift between the two traces. These techniques are known generally, and also within the seismic industry, for example as applied to assessing 4D time shifts.

This approach allows seismic data to be collected by many independent seismic receivers with independent and potentially inaccurate clocks and allows the data recorded by each receiver to subsequently be time shifted to correct for the differing clock drift of the receiver that recorded it. The method makes use of the data recorded by the receivers as part of the seismic acquisition survey and no separate, specific timing signals are needed. This approach can potentially accommodate a different time-variable correction for each receiver.

Typically, techniques taught herein will be applied to continuously recorded data and so can be useful in a passive seismic survey, such as where seismic signals from other operations in the area (drilling, production, fracking activities etc) or from background noise (waves, earthquakes etc) are recorded, or a simultaneous source survey such as that described in WO 2008/025986, etc. In this embodiment, relatively long data recordings (e.g., several hours per receiver) will be used to estimate relative time shifts between nearby traces, preferably using cross correlation.

The relative time shifts can be used to estimate the residual, absolute time shift which will be an estimate of the unique constant clock drift associated with each receiver, preferably by solution of a least squares over determined system of equations. To assist, a least squares solver can be used. In some cases the system of equations might be augmented by constraints on the solution.

Optionally, step (a) can comprise the steps of:

(a1) identifying a plurality of proximate trace pairs, each proximate trace pair comprising a first trace recorded by a first receiver and a second trace recorded by a second receiver proximate to said first receiver;

(a2) for the clock in each of said first and second receivers, selecting a shooting time window;

(a3) calculating a linear estimate of a drift correction for each of said clocks during said shooting time window; and (a4) adjusting said first and second traces in time according to the calculated linear estimate of said drift correction for the corresponding clock.

Here, it will be understood that references to the first and second traces in steps (b) and (d) refer to the trace as adjusted by step (a4).

The shooting time window for a given clock can be selected by identifying a receiver clock first time and a receiver clock second time corresponding to known accurate first and second times. The known accurate first and second times can be times when a comparison of two times as recorded by the clock can be made with the corresponding true times. For example, the clocks may at times be synchronised to an accurate time source, such as a GPS receiver. The shooting time window can span substantially all of the seismic survey, though a shorter time window could alternatively be selected.

The skilled reader will understand that step (a1) may be performed after steps (a2) to (a4) i.e. the traces may have a linear correction applied to them before the trace pairs are established.

Accordingly, given the linear drift estimate for each receiver and the residual, absolute shift as calculated in step (b), the traces for each receiver can be corrected.

In embodiments, the method may comprise identifying at least two trace sections for each of said first and second traces, and performing steps (a) to (d) separately for each of the trace sections, thereby forming a plurality of time-corrected traces representative of the subsurface of the earth wherein each time-corrected trace comprises at least two sections of time-corrected trace corrected using the clock drift estimate obtained for the respective section of trace.

In other words:

step (a) may comprise the steps of:

(ai) identifying a plurality of proximate trace pairs, each proximate trace pair comprising a first trace recorded by a first receiver and a second trace recorded by a second receiver proximate to said first receiver; and (aii) for each of the first traces and second traces, identifying a first trace section and at least one subsequent trace section;

step (b) may comprise determining, for each of said proximate trace pairs, a relative time shift between said first trace section of said first trace and said first trace section of said second trace, and determining, for each of said proximate trace pairs, a relative time shift between said subsequent trace sections of said first trace and said subsequent trace sections of said second trace;

step (c) may comprise, for each trace section, inverting the relative time shifts determined in step (b) to obtain a clock drift estimate for the clocks of the first and second receivers; and step (d) may comprise using the clock drift estimates obtained in step (c) to time correct the corresponding sections of the first and second traces of each proximate trace pair, thereby forming a plurality of time-corrected seismic traces representative of the subsurface of the earth, each of which comprises at least two sections of time-corrected seismic trace.

Again, it will be understood that step (ai) may be performed after the trace sections have been identified.

Typically, the trace sections may be multiple hours in length, e.g. sections up to about 6 hours, such as between 1 and 4 or 1 and 3 hours. In certain conditions, though, trace sections of at least one day, or multiple days, such as up to 2 to 3 days, may be appropriate, as discussed in more detail below.

In embodiments, the relative time shift between said first trace and said second trace may be determined in step (b) by determining the relative time shifts between a plurality of shot records comprised in said first trace and corresponding shot records in said second trace, and determining the average of said relative time shifts between said corresponding shot records.

By shot record, it is meant a segment of seismic trace comprising the recorded reflections resulting from a particular seismic source activation. In general, the exact time of the source activation will be known, and so the segment of seismic trace which will comprise the recorded signals/reflections can be known, despite the drift in the clock, with enough accuracy as to identify the appropriate segment.

The average of said relative time shifts between said corresponding shot records is determined so as to give a single, representative value for the relative time shift between said first trace and said second trace. The average of said relative time shifts may be determined by stacking. The process of stacking is well known to the skilled reader and refers to summing a plurality of signals. Averaging the relative time shifts in this way can be helpful since an individual time shift estimate corresponding to a single proximate trace pair will likely contain errors; however, the error will generally be averaged out to zero if several time shifts are averaged/stacked.

Although determining relative time shifts in this "shot by shot" manner is possible, it is not necessary. Instead, relative time shifts may be determined in respect of longer periods of time, such as in respect of trace sections as described above.

A kinematic correction may be applied, for each proximate trace pair, to remove the effect of differential arrival times (i.e. event moveout or velocity) between the first and second receivers associated with said proximate trace pair. The kinematic correction may be applied before or after step (b). The kinematic correction will typically be applied before step (c). The kinematic correction can be an NMO (normal moveout) correction or an LMO (linear moveout) correction. The use of NMO or LMO is particularly applicable where the kinematic correction is applied before step (b).

In embodiments, the method may further comprise identifying a trend in the clock drift estimates obtained in step (c) for each of the clocks of said first and second receivers and removing said trend from said clock drift estimates, thereby forming de-trended clock drift estimates for each of the clocks of the first and second receivers. In this case, step (d)

comprises using said de-trended clock drift estimates to time correct the first and second traces of each proximate trace pair, thereby forming a plurality of time-corrected seismic traces representative of the subsurface of the earth. The trend may be identified and removed using a de-trending algorithm or using a smoothing filter to identify the trend which can then be removed. De-trending algorithms and smoothing filters are well known and readily available. Removing this trend can be useful to reduce inaccuracies due to moveout.

It is possible to provide at least one of said receivers with a clock which is an accurate clock. For example, up to 5%, or between 1% and 5%, such as between 1% and 3%, of the total number of clocks may be accurate clocks. Use of at least on accurate clock can improve the accuracy of the method in the vicinity of the accurate clock(s).

In embodiments, the proximate trace pairs are identified in step (a) such that each proximate trace pair is associated with at least one other proximate trace pair.

A first proximate trace pair can be directly associated with a second proximate trace pair if either the first or second trace of the first proximate trace pair is also the first or second trace of the second proximate trace pair. A proximate trace pair can also be indirectly associated with another proximate trace pair through a chain of directly associated proximate trace pairs. In an example, each proximate trace pair is associated, either directly or indirectly, with all the other proximate trace pairs identified in step (a). In this way, a "network" of proximate trace pairs is established.

The above methods may further comprise the steps of
(e) using said plurality of time-corrected seismic traces to image at least a portion of said region of the subsurface of the earth; and
(f) using said imaged region of the subsurface of the earth in exploration for hydrocarbons within the region of the subsurface of the earth.

In another aspect, there is a method of seismic exploration of a region of the subsurface of the earth, wherein is provided a plurality of continuously recorded seismic traces collected in a seismic survey conducted proximate to the region of the subsurface of the earth, each of said traces being recorded by a receiver having a clock. The method comprises the steps of:
(a) accessing a plurality of time-corrected traces created by a method comprising the steps of:
(i) identifying a plurality of proximate trace pairs, each proximate trace pair comprising a first trace recorded by a first receiver and a second trace recorded by a second receiver proximate to said first receiver;
(ii) for each of said proximate trace pairs, determining a relative time shift between said first trace and said second trace;
(iii) inverting the relative time shifts determined in step (b) to obtain a clock drift estimate for the clocks of the first and second receivers; and
(iv) using the clock drift estimates obtained in step (c) to time correct the first and second traces of each proximate trace pair, thereby forming a plurality of time-corrected seismic traces representative of the subsurface of the earth;
(b) using said accessed time-corrected seismic traces to image at least a portion of said region of the subsurface of the earth; and
(c) using said imaged at least a portion of the subsurface of the earth in exploration for hydrocarbons within the region of the subsurface of the earth.

In any of the embodiments above, the method may be repeated, thereby forming a plurality of time-corrected seismic traces representative of the subsurface of the earth. The method may be repeated iteratively. Repetition in this way can improve the accuracy of the time correction.

Other embodiments and variations are certainly possible within the scope of the instant disclosure and can readily be formulated by those of ordinary skill in the art based on the disclosure herein.

The foregoing has outlined in broad terms the more important features of the instant disclosure so that the detailed description that follows may be more clearly understood, and so that the contribution of the instant inventors to the art may be better appreciated. The instant disclosure is not to be limited in its application to the details of the construction and to the arrangements of the components set forth in the following description or illustrated in the drawings. Rather, the methods and apparatus disclosed herein are capable of other embodiments and of being practiced and carried out in various other ways not specifically enumerated herein. Finally, it should be understood that the phraseology and terminology employed herein are for the purpose of description and should not be regarded as limiting, unless the specification specifically so limits the text and claims that follows.

BRIEF DESCRIPTION OF THE DRAWINGS

Other objects and advantages of the invention will become apparent upon reading the following detailed description and upon reference to the drawings in which.

DETAILED DESCRIPTION

Figure 1:
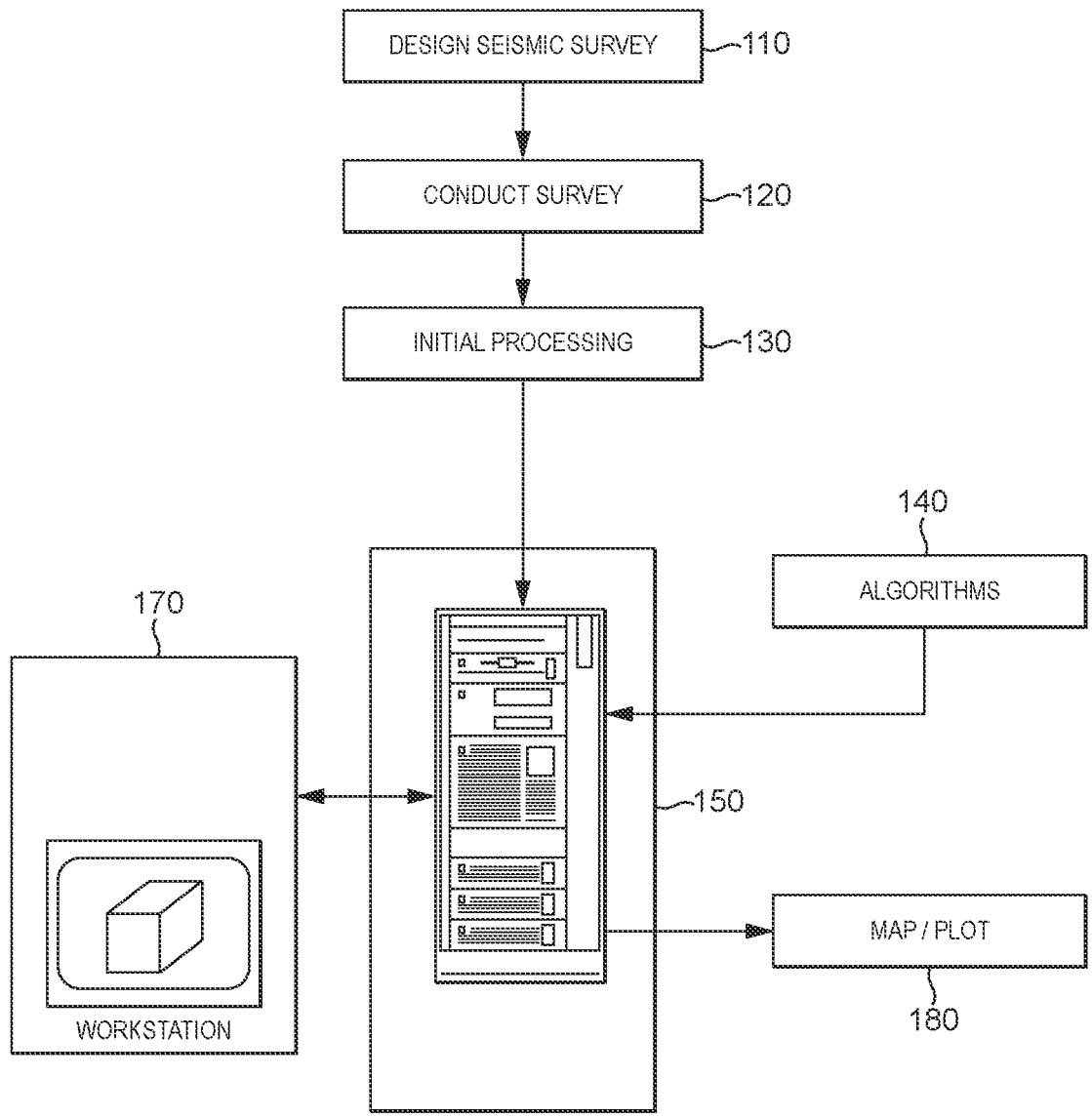
FIG. 1 illustrates a general seismic processing environment suitable for use with the instant disclosure.

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

According to an embodiment, there is provided a method of seismic processing that more readily accommodates receiver clock drift than has been available heretofore. More specifically, an embodiment provides a system and method for improving images obtained from seismic data (both transmission and reflection) using an approach that automatically recognizes and removes errors in timing due to receiver clock drift which might otherwise degrade or introduce distortions into the processed seismic data that are used in exploration and production to find subsurface resources.

Turning first to FIG. 1, this figure contains a general overview of a typical seismic acquisition and processing environment. As is indicated, a seismic survey will be designed 110 and collected 120 according to methods well known to those of ordinary skill in the art. The survey might be, for example, a VSP (vertical seismic profile), land survey, marine survey, or some combination. As is well known, the sources and receivers are positioned according to the survey design, recording is commenced and the sources are activated according to the survey design. The receivers sense and record the seismic signals. The recorded seismic waves (i.e., the seismic data) may or may not be subjected to some in-field processing before transmitting it on to a processing center where the bulk of the processing will typically take place.

Typically within a processing center some initial computerized processing will be performed to associate each seismic recording with a surface or other location (x/y coordinates) (box 130), although some aspects of this procedure might also have been performed in the field. In either case, a computer system 150, which might be a workstation, a server, a main frame, a parallel computer, a networked collection of computers or workstations, etc., will typically be provided with software that implements algorithms (item 140) for processing/imaging data. An embodiment of the techniques taught herein would typically be loaded onto the processing computer as part of item 140 and applied to the seismic data before the image processing is carried out. In this way, conventional image processing can be performed on time-corrected data.

Conventionally, the seismic data will be processed and viewed on a computer display such as that of a workstation 170. Output from the seismic processing may be used to create maps or plots of seismic data and/or seismic attributes 180 according to methods well known to those of ordinary skill in the art.

Figure 2:
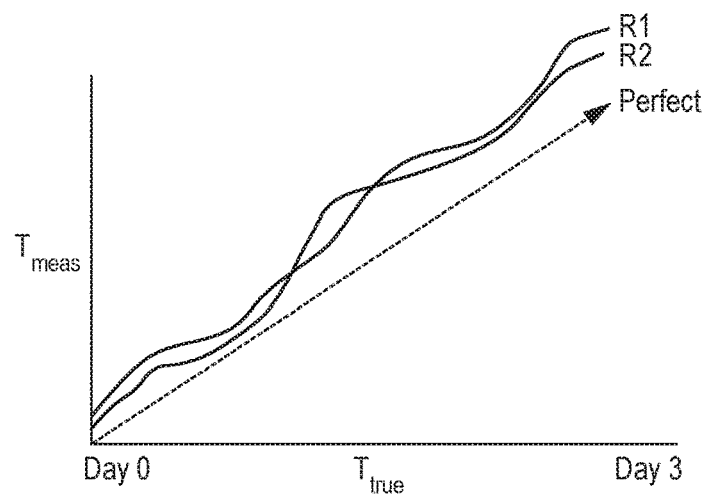
FIG. 2 illustrates in a general way that receiver clocks are inaccurate, and might be influenced by temp, age, and variation in natural clock-rate inherent to each oscillator at manufacture.

Turning next to FIG. 2, this figure contains a schematic representation of one aspect of the problem associated with clock drift. If the receiver clocks all have the same perfectly linear drift, the accumulating clock error for all devices would lie along the straight line i.e. the measured time would perfectly match the true time. However, because the drift differs from device to device as well as, at least potentially, over time for any given receiver, the accumulated clock error will likely be different for each receiver R1 and R2.

Figure 3:
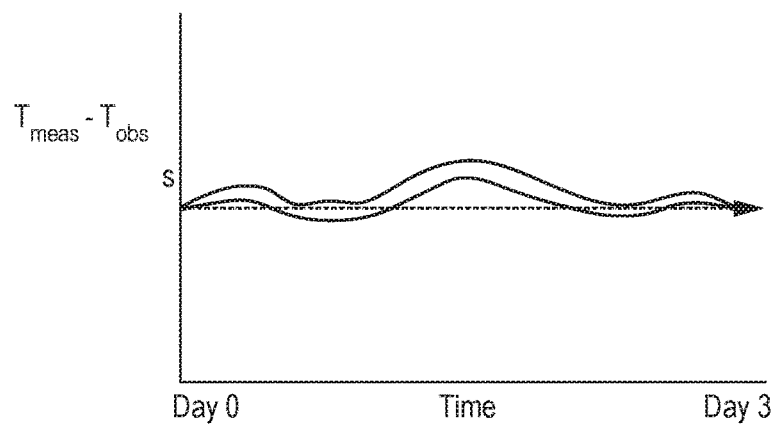
FIG. 3 illustrates in a general way that the drift in receiver clocks may not be exactly linear over time and when a linear trend is removed, inaccuacies might remain.

FIG. 3 contains a schematic illustration of the residual clock error after removal of a best-guess estimate of the linear drift (e.g., as obtained by synchronizing the clock before deployment and then determining the time differential after the receiver is recovered or remotely from a transmitted current receiver time or by knowing the difference between the internal time and the time as measured by an accurate clock, etc.). In some embodiments, the estimated linear drift will be used to correct the seismic data before applying the techniques taught further below.

FIGS. 2 and 3 show an example of data recorded over 3 days. In practice, most surveys have a much longer duration. However, the data shown in the figures show how the clock drift can vary over time, for example with temperature. Specifically, the drift of a clock can vary cyclically if, for example, the atmospheric temperature is higher during the day than at night.

In some embodiments the following assumptions might be made to expedite obtaining a numerical estimate of each receiver's clock drift:

The recorded wave fields will be assumed to be at least approximately coherent in space, except for station consistent effects, e.g., receiver statics, clock error, etc.

Receivers will be assumed to be spatially sampled at an interval in at least one direction that can characterize that coherence.

It will be assumed for purposes of this embodiment that the linear clock drift trend can be removed by standard methods. Additionally, if a receiver is dead at time of retrieval it will be omitted.

It will either be assumed that there is enough diversity of wave arrival directions to cancel out offset and structure dependence of the statistics of the differential arrival times, or that a kinematic correction has been applied to the data.

Figure 4:
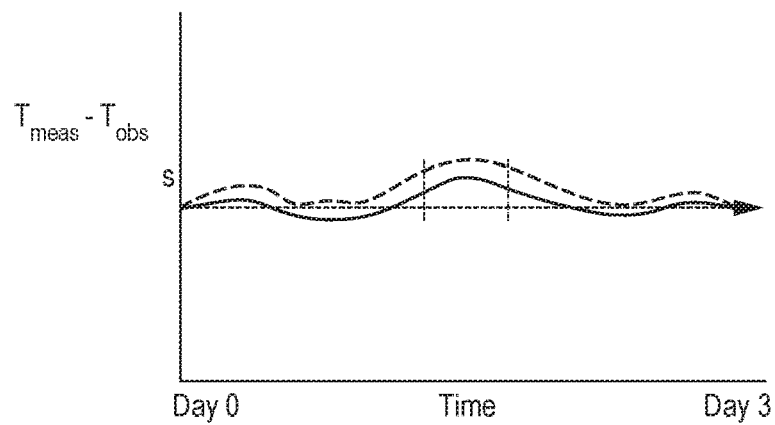
FIG. 4 contains a schematic illustration of one approach to an embodiment that uses a section of the trace so that the residual clock drift is quasi-static during that time period.

Finally, as discussed in more detail below, it is preferable to have enough shots (source activations) within some period of time such that the error-difference between two nearby stations can be considered a "static" difference within that time period (e.g., FIG. 4).

Figure 5:
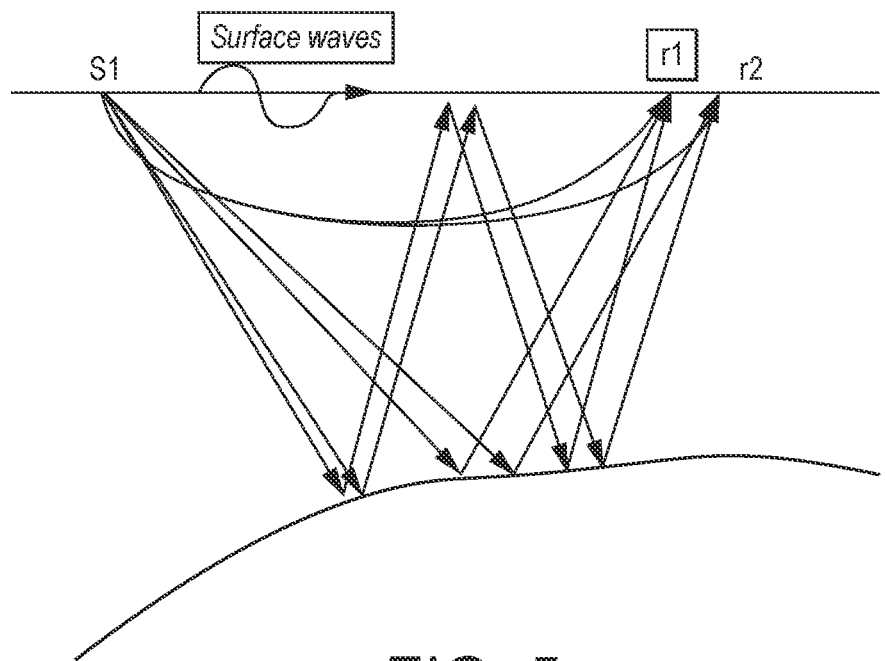
FIG. 5 illustrates seismic arrivals that may be recorded by each receiver and therefore may be used in this embodiment to correct each receiver for clock drift.

Turning now to FIG. 5, if the two traces recorded at r1 and r2 in this figure are cross correlated, the cross correlation will be the average time difference between all of the arrivals on the two traces weighted by relative amplitudes of each trace. This is influenced by structure, velocity, offset, wave mode, etc., and if present, the instantaneous difference in what time the two receivers think it is. The present invention determines that instantaneous difference. Although a cross correlation is one computation that is useful in this context, any other computation that measures similarity between two seismic traces could be used, as discussed above.

Figure 6:
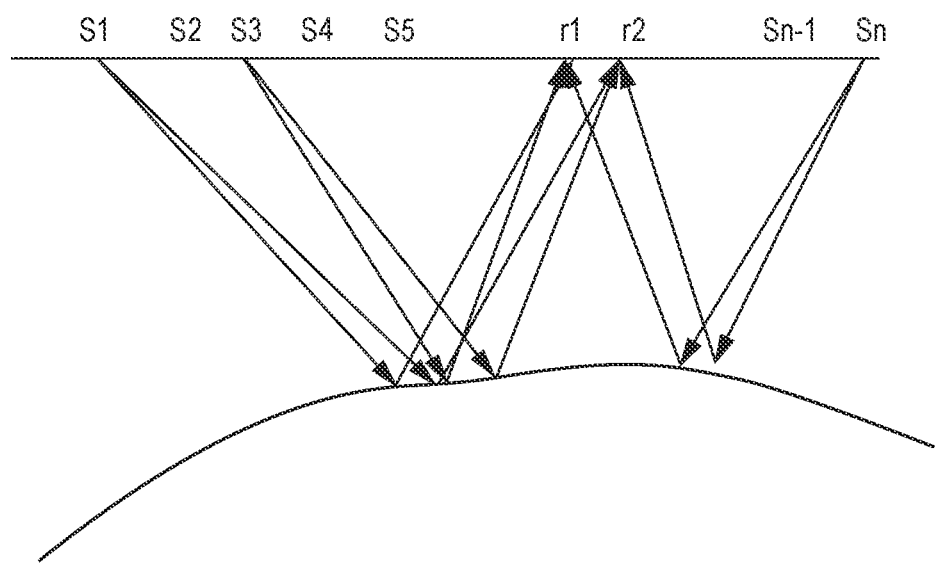
FIG. 6 illustrates an embodiment where the receivers $r_1$ and $r_2$ that are cross correlated are chosen to be proximate to each other.

With respect to FIG. 6 and continuing with the present embodiment, one approach would be to cross correlate the traces recorded at r1 and r2 shot by shot, then stack those cross correlations. Statistically this will tend to remove the variance of all of the effects that are not constant from trace to trace, e.g., the variance in arrival times due to geometric effects and from wave-mode to wave-mode will tend to be suppressed. What then remains will be anything different in the kinematics that is constant from shot to shot, so a receiver static, and a systematic difference in what time the receivers think it is. In some cases the mean kinematic difference from the wave field due to offset difference average and structure will still remain.

As an example, the mean difference in kinematics due to offset and velocity could be removed by choosing a set of traces where the mean might be expected to be zero (e.g., a symmetric split spread).

NMO (normal move out) or LMO (linear move out) may also be applied depending on the wave type, with the expectation that average difference due to those effects will be attenuated.

Figure 7:
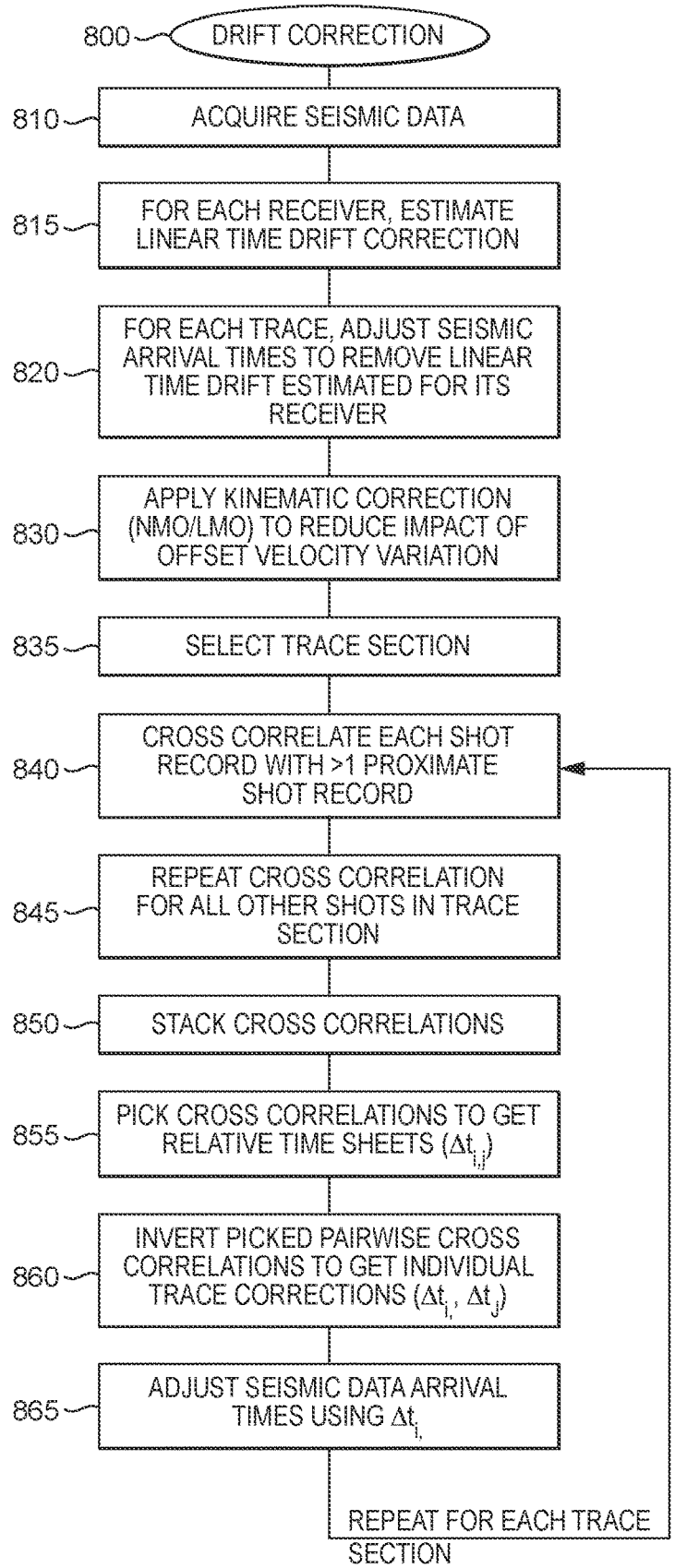
FIG. 7 illustrates an operating logic suitable for use with an embodiment.

Turning next to FIG. 7, an operating logic suitable for use with an embodiment 800 is set out. The skilled reader will understand that certain steps may be performed in a different order. For example, the kinematic correction may be applied after the cross correlation, or the length of trace section may be selected before the shot records are identified, but other examples will be apparent to the skilled reader.

As an initial step 810, seismic data will be acquired continuously over a target of interest according to methods well known to those of ordinary skill in the art. The survey might be comprised of 2-D or 3-D data, actively sourced or passively sourced.

After the data have been acquired, a linear time drift correction will be determined for each receiver as discussed previously (box 815). This correction will then be applied to the data recorded by that receiver (box 820).

Next, a kinematic correction (e.g., NMO or LMO) will be applied to reduce the potential impact of offset and velocity variation (box 830) on the computations that follow. This approach is useful where the seismic traces are conventionally acquired active source data with a known source location, and particularly where the cross-correlation calculation is performed "shot by shot". Determining the amount of time correction to apply to a seismic trace given its location relative to the source is well known to those of ordinary skill in the art.

Note that in the case of a survey comprising a large number of source activations, the kinematic correction (e.g. LMO/NMO) may not be necessary. Nevertheless, it might make sense in some cases where, for example, there was a predominance of energy from a known direction that was present on several of the traces. In that case, LMO or NMO might be applied to traces that recorded the noise in order to better align those traces.

A trace section will be selected (box 835) over which section it is believed the clock drift is approximately or quasi-stationary. That might be, for illustrative purposes only, a few hours, say 2 to 3 hours, though it could be much longer. In some cases, there might be a single length of trace section that covers the entire survey. However, it is more likely that multiple trace sections (e.g., the first three hours, the next three hours, etc.) would be selected until all of the data in the survey have been grouped and processed. Additionally, it is possible that the trace sections might not all be the same duration (e.g., 3 hours for the first three window, 6 hours for the next 2 windows, etc.).

Further, it is possible that the trace sections might overlap. In other words, a second section may be chosen to include, at its start, data also contained at the end of the previous section. Such an approach to sectioned, or "windowed" data is well known to those of ordinary skill in the art and the amount of overlap may need to be selected on a case-by-case basis depending on the rate of drift in the clocks.

Next, and continuing with the present example as applied to continuously recorded data, the data in a shot record will be cross correlated with the data from the corresponding shot record from some number of its closest neighbors around it, e.g., the three or 6 closest/neighboring traces (box 840). This establishes a plurality of proximate trace pairs. Of course, those of ordinary skill in the art will recognize that the number of traces that will be used is a decision that may need to be made on a case-by-case basis and is well within the capability of one of ordinary skill in the art. For example, proximate receivers could be selected by choosing receivers that "see" the same seismic event (i.e. the reflected signals that reach the proximate receivers have encountered more or less the same geological conditions during their travel) or that are within some predetermined distance of each other. This will be based on the geometry of the receivers and could be affected by ground conditions such as differences in the near surface, elevation etc. In general, the method corrects the time of the receivers with decreasing error for decreasing receiver separation. In embodiments of this invention, typical receiver separations can be up to about 30 m, such as less than about 25 m, or less than about 15 m for example.

The cross correlation process may be repeated for each shot within the trace section (box 845), and then all the cross correlations for that trace section will be stacked across shots (box 850). This effectively enhances the power of the cross-correlation which could potentially make the identification of the time differential more reliable. However, in some cases this might not be necessary and, as such, this step is optional.

Continuing with the present example, the maximum value of the stacked cross correlations between each proximate pair of traces for a given trace section will be picked to determine the relative time shift (lag) between the two trace sections, $\Delta t_{i,j}$ (box 855).

Next, in this embodiment the clock drift estimate, $\Delta t_i$, i=1, N associated with each of the N clocks in the analysis, for the time period covered by the trace section will be estimated (box 860). In this embodiment the clock drift, $\Delta t_i$ is the residual, absolute time shift which remains after the linear correction described above has been applied. Given the relative time shift that has been calculated between each trace pair, and recognizing that the sought after absolute clock drifts are related to the calculated relative time shifts by the equation $\Delta t_{ij} = \Delta t_i - \Delta t_j$, an over determined system of equations can be constructed that can be inverted (box 860) to obtain the $\Delta t_i$ for each trace section:

$$\begin{bmatrix} 1 & -1 & \ldots & 0 & 0 \\ 1 & 0 & -1 & \ldots & 0 \\ \vdots & & & & \vdots \\ 0 & 0 & \ldots & 1 & -1 \end{bmatrix} \begin{bmatrix} \Delta t_1 \\ \Delta t_2 \\ \vdots \\ \Delta t_N \end{bmatrix} = \begin{bmatrix} \Delta_{1,2} \\ \Delta_{1,3} \\ \vdots \\ \Delta_{N-1,N} \end{bmatrix}$$

It will be understood that the relative time shifts $\Delta t_{i,j}$ are those that have been calculated for the proximate trace pairs. So, to be clear, there will not be a time shift for every combination of all of the receivers, only for the proximate pairs of receivers.

It can be seen, therefore, that the $\Delta t$ vector inverts all of the time shifts at once to derive clock drift corrections for each receiver clock.

Solving for the $\Delta t$ vector can be done according to methods well known to those of ordinary skill in the art. In some cases, whitening might be added to diagonal of the matrix or certain constraints could be imposed on the solution in order to stabilize it. For example, the $\Delta t_i$ might be assumed to sum to zero, or the drift associated with at least one of the clocks is known, or at least one of the clocks is an accurate clock. For example, at least one of the clocks may be GPS synchronized clock. Possibly between 1% and 5%, such as between 1% and 2%, of the total number of clocks may be accurate clocks. In the form presented above, this system of equations may not be exactly or uniquely invertible, hence the practice of adding additional constraints, whitening, solving in a least-squares or L1-norm best-fit sense, etc.

After a solution has been obtained (box 865) for a given trace section, the process is repeated for subsequent trace section until the whole of each seismic trace in the analysis can be adjusted to correct for its mistiming due to clock drift. In some cases this will be a correction based on a combination of the calculated residual drift and the calculated linear drift correction which may have been removed previously. In other cases this might be a static shift where a linear or other drift correction removal is not necessary.

Note that the above method could, in some cases, leave unaddressed the average receiver time error if it were different from zero. If that is suspected to be a problem, one approach to removing this component would be to perform cross correlations between traces recorded by the same receiver in different shots. The same equations and solution techniques described above could still apply in this case. Additionally, if near offset traces are available, simple near offset times, like uphole times could be used to give an indication of shot time error.

Alternatively, as mentioned above, whole trace sections, comprising hours or days of recorded data and therefore containing the signals resulting from multiple source emissions, may be cross-correlated with trace sections of corresponding length from proximate receivers, rather than cross correlating on a shot by shot basis within a given trace section. In effect, this might be thought of as an "all shot" gather.

In choosing the length of the trace section, the intention is to have a section of trace during which the drift is relatively static/stable (i.e. not increasing or decreasing significantly. The length of the trace section will therefore depend on the degree of drift that the clock suffers from, which will be known to some level by the user. For example, the user may know to some level whether the clock is naturally prone to drift a lot, and will also know whether external conditions, such as temperature, are likely cause more or less drift. For example, the user may be relatively confident that a clock located in a region which is hot during the day and cold during the night will drift more than a clock located in a region which has a relatively stable temperature throughout the day and night. Typically, the trace sections may be multiple hours in length, e.g. sections up to about 6 hours, such as between 1 and 4 or 1 and 3 hours. In certain conditions, though, trace sections of at least one day, or multiple days, such as up to 2 to 3 days, may be appropriate. This parameter may need to be determined on a trial-and-error basis in order to satisfy the quasi-stationary assumption mentioned above in connection with one embodiment.

One advantage of using sections of trace in this way is that absolute time is less relevant. A trace section that contains recorded data would be all that is needed. Additionally, if shots/source activations have been recorded during the recording of the continuous data and the activation times are known for the source activations, they can be extracted from the continuous data and handled in accordance with the methods associated with conventionally sourced seismic data.

Figure 8:
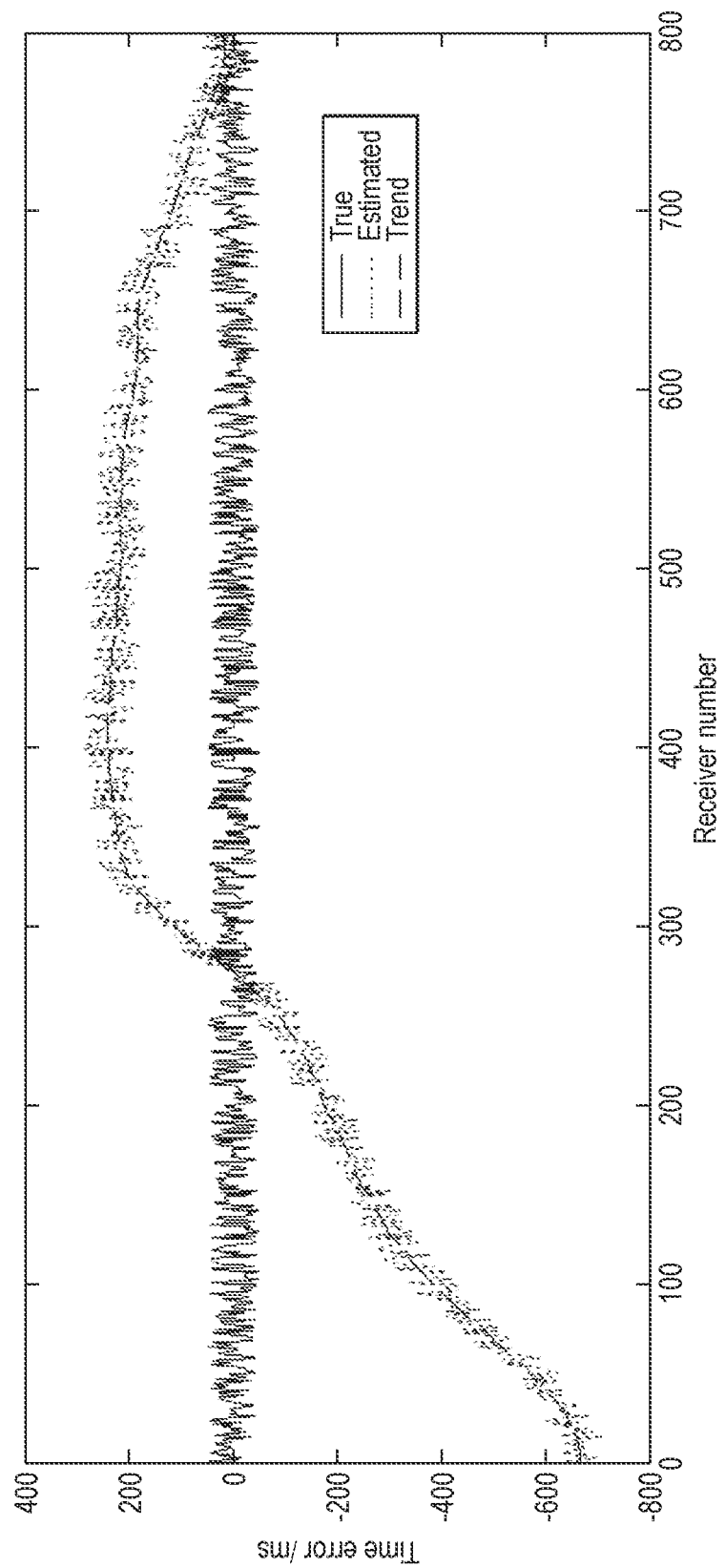
FIG. 8 shows derived clock drift estimates compared with actual clock drifts for a synthetic data example.

A further step of removing a trend from the estimated clock drift for each receiver will now be described. FIG. 8 shows the randomly generated clock drifts applied to 800 receivers in a synthetic seismic data set (line T). In this case, the generated clock drifts are between −50 ms and +50 ms. FIG. 8 also shows the clock drift estimate, calculated using an embodiment of the invention, for each of the receiver clocks (line E). It can be seen that there is a long wavelength trend across the set of receivers. In other words, the estimated clock drifts vary from the actual generated clock drifts by a degree which follows a trend that varies slowly over the set of receivers. The trend is shown by the dashed line running through line E. It can be seen that the trend is inaccurate but the short-wavelength part of the result superimposed on the long-wavelength trend is accurate.

The trend can be identified using any suitable technique, examples of which are well known and include de-trending algorithms or smoothing filters. As an example, a Savitzky-golay (polynomial) smoothing filter can be used.

Figure 9:
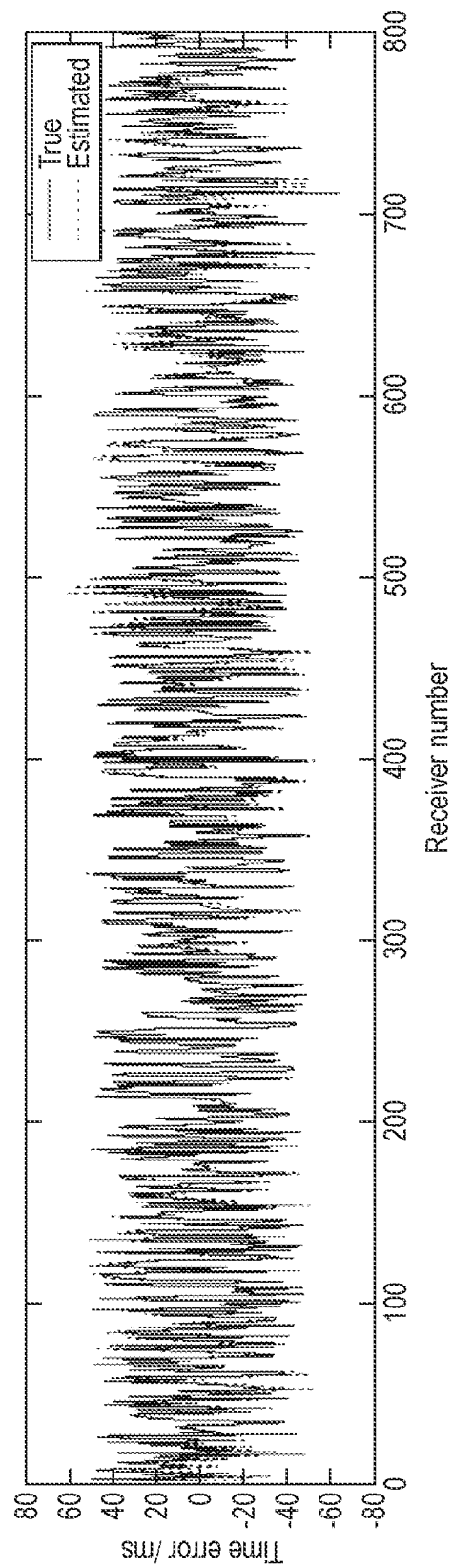
FIG. 9 shows de-trended clock drift estimates compared with actual clock drifts.

FIG. 9 shows the trend removed from the estimated clock drifts. It can be seen that, with the long wavelength trend removed from the estimated clock drifts, the short wavelength trend, which is superimposed on the long wavelength trend and represents the variation in estimated clock drift from one receiver to the next, closely matches the actual generated clock drifts. In other words, the method of the invention is able to identify the clock drift but this clock drift can have superimposed on it a long wavelength trend understood to be caused by moveout. By removing the long wavelength trend, the effect of moveout can be removed.

Figure 10:
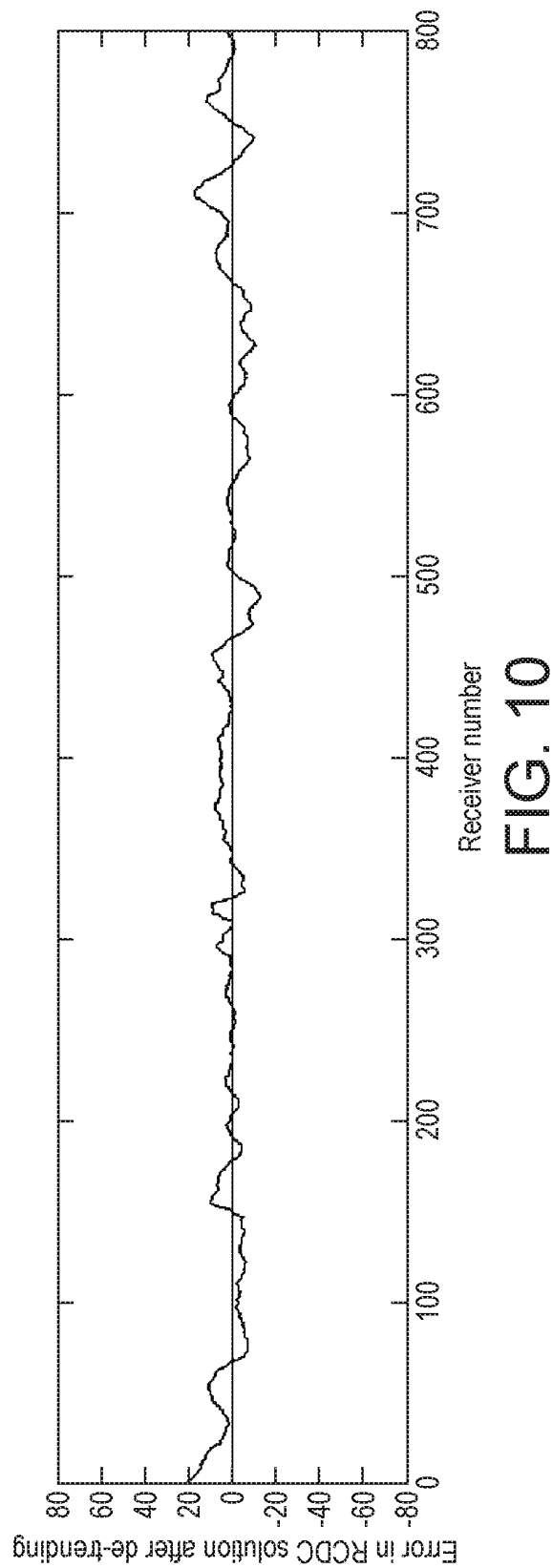
FIG. 10 is a difference plot showing the difference between the de-trended clock drift estimates and the actual clock drifts of FIG. 9.

The error (in milliseconds) between the de-trended clock drift estimate and the randomly generated clock drift can be seen in FIG. 10, which shows the difference between the two plots in FIG. 9. It can be seen that once the trend is removed, the estimates are accurate; thus the magnitude of the clock errors present in the data can be significantly reduced using the method described herein.

De-trending the estimated clock drifts can be carried out with or without other steps described herein. For example, it may be used instead of, or in combination with one of the kinematic corrections described above.

The drift correction techniques described herein might also be used in the case of simultaneous/overlapping sources. There are techniques for separating the resultant overlapping reflections that are well known to those of ordinary skill in the art. For example, the shots might be separated using methods such as those described in WO 2008/025986, the disclosure of which is incorporated herein by reference as if set out at this point in full. The separated reflections can then be cross-correlated and optionally stacked as described above.

Increasing accuracy in the time correction can be achieved for increased rates of source activation (or shooting). In other words, the more source activations in a given time, the better the time correction can be. Increased source activation rates can be achieved, in some embodiments, by using simultaneous/overlapping sources.

An example of application of an embodiment of the methods described herein will now be given. Synthetic seismic data was generated using a model of the subsurface. 381 shots were modeled, the shots being in a line with a 25 m shot interval. There was a 12.5 m receiver interval. The generated records had realistic reflectivity and ground roll.

Figure 11:
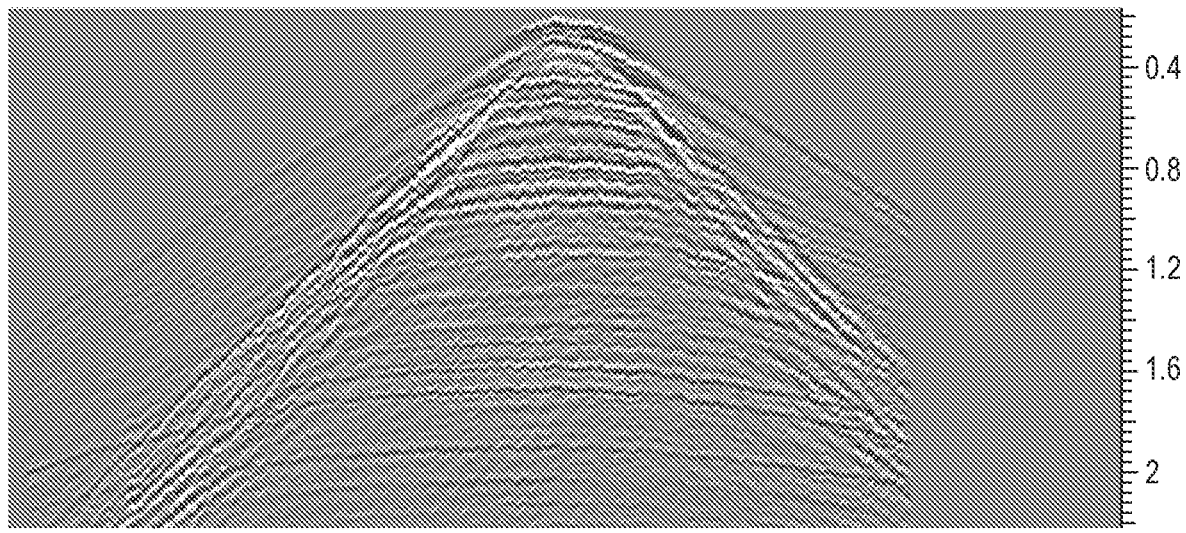
FIG. 11 shows synthetic seismic data before drift correction.

A random timing error of +/−10 ms was added to each of the generated records. The seismic data with the random timing error added is shown in FIG. 11.

The example shows the principles involved in this technique, though it will be seen that, due to the nature of the modeled data, not all of the steps described above were used. For example, the random timing error added to each record was constant throughout the "survey". Accordingly, it was not necessary to perform a linear correction. Similarly, because the error did not vary over the course of the "survey", it was not necessary to perform the method for multiple trace sections. Instead, the method was applied to all the shot records as if there were just one trace section.

Further, it will be understood that the model produced a plurality of discrete "shot records"—these records, can be viewed as equivalent to the shot records described above, which are segments of the continuously recorded seismic traces, and which can be identified in the continuously recorded seismic trace with enough accuracy, despite the drift in the clocks.

In this example, a 2000 m/s NMO kinematic correction was applied to the data, though this is an optional step.

Taking a first receiver, a plurality of proximate trace pairs were identified. In particular, the first receiver was paired with the three receivers on either side of it (in the line of receivers), thereby totaling six proximate receiver pairs.

The first shot record of the first receiver was cross correlated with the first shot record of its six proximate receivers. The second shot record of the first receiver was cross correlated with the second shot record of its six proximate receivers, and so on for all shot records.

The cross correlations for the series of shots were stacked for each receiver pair.

The delay times of the maxima of the stacked cross correlations for the various proximate receiver pairs were inverted using the equation set out above to determine the absolute drift associated with each receiver clock. The absolute drifts for the various receivers were de-trended as described above to remove a long wavelength trend, leaving the de-trended clock drifts for each receiver.

Figure 12:
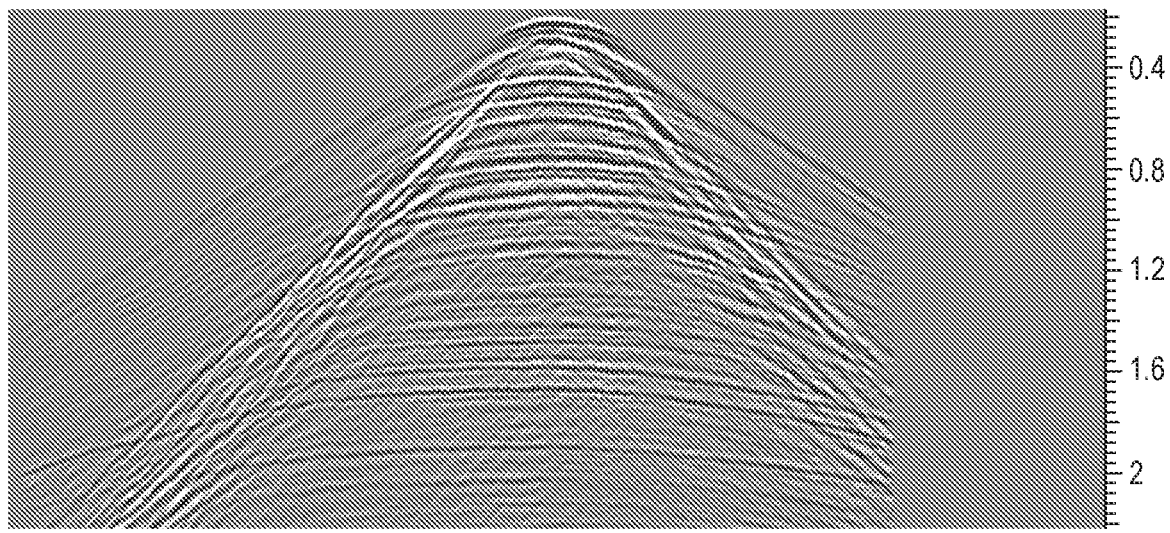
FIG. 12 shows synthetic seismic data after drift correction in accordance with an embodiment.

The de-trended drifts were applied as a correction to the data shown in FIG. 11. The result of the correction is shown in FIG. 12. It can be seen that errors in the data in FIG. 11 have been removed.

Figure 13A:
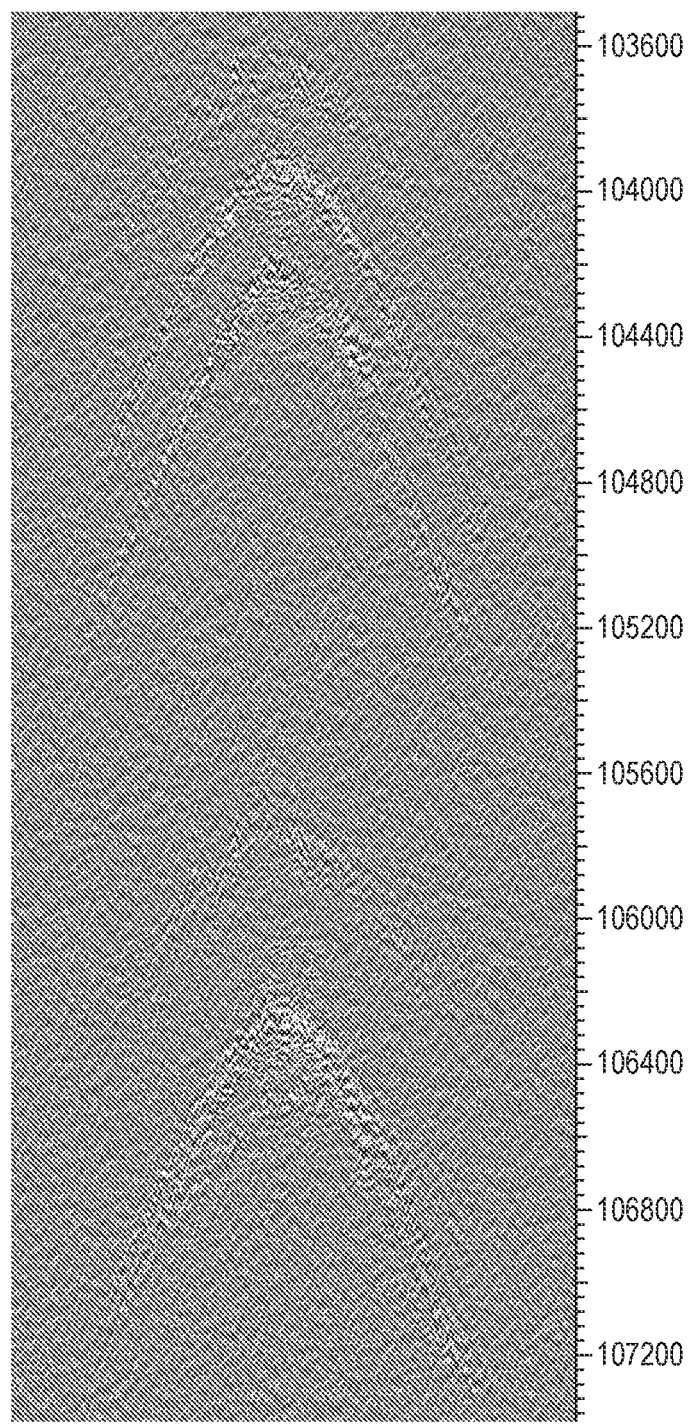
FIGS. 13a to 13c show synthetic seismic data with random clock drift applied to the data (FIG. 13a); synthetic seismic data of FIG. 13a after application of the method according to an embodiment (FIG. 13b); and synthetic seismic data of FIG. 13a after removal of actual clock error (FIG. 13c).

FIG. 13 shows another example of seismic data processed according to the present invention. FIG. 13a shows synthetic seismic data with a random clock drift applied to it. The synthetic data is based on the same data as shown in FIG. 11. Differences include a random clock drift having a maximum of +/−50 ms, an increased ground roll, a signal to noise of −6 dB ("red noise", i.e. stronger at low frequencies and typical of electronic recording devices) and the recorded data was merged together to simulate simultaneous source activation (known as simultaneous shooting) wherein the recorded reflections overlap in the seismic trace.

Figure 13B:
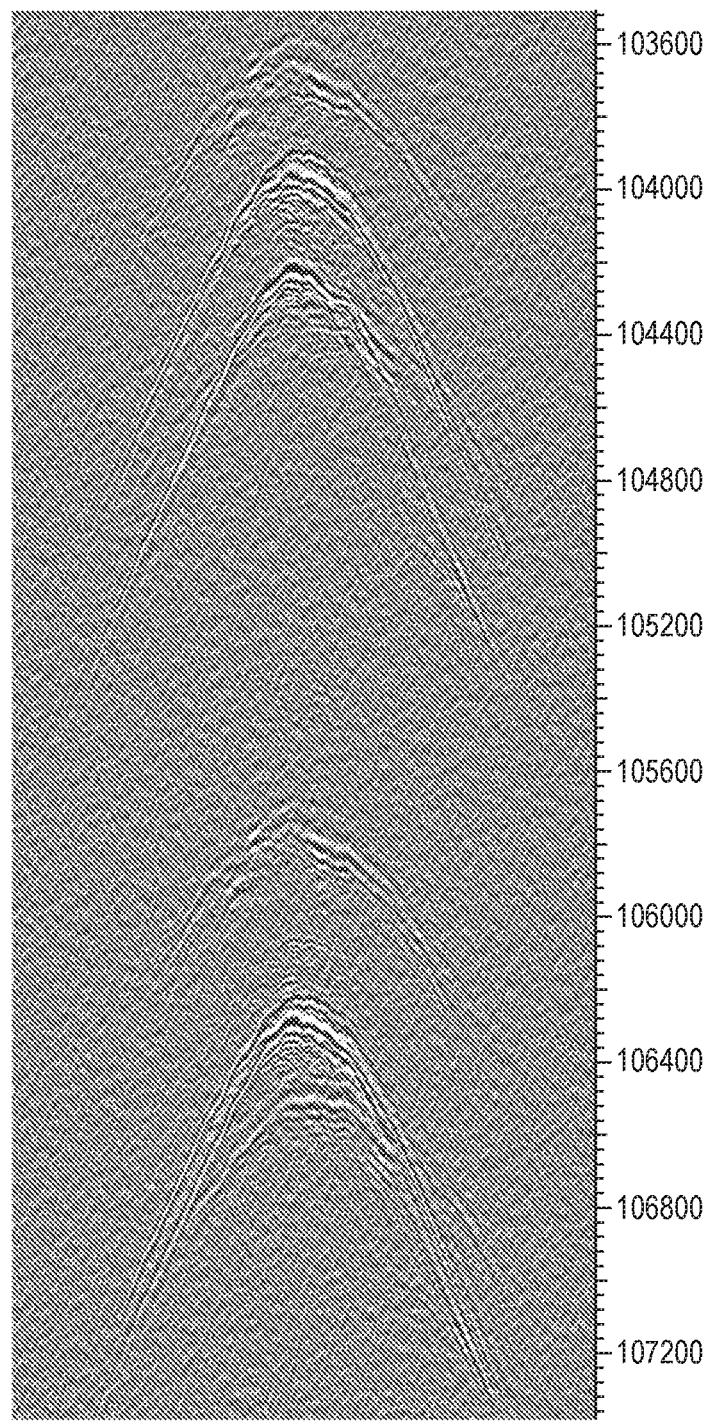

FIG. 13b shows the seismic data after estimating the clock drift, de-trending the estimated clock drifts and correcting the synthetic data using the de-trended clock drifts to produce the time-corrected seismic data seen in FIG. 13b.

Figure 13C:
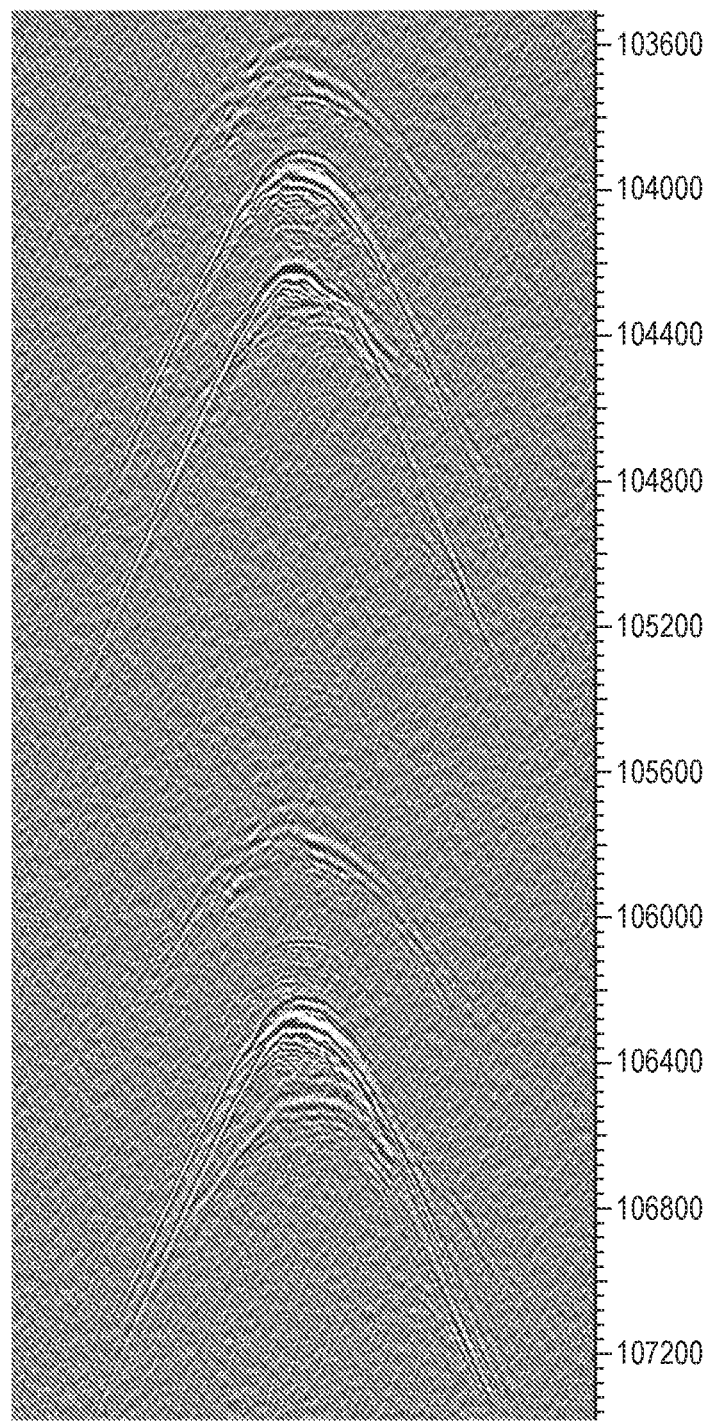

FIG. 13c shows the synthetic seismic data with the true, randomly generated clock drift removed. It can be seen that the data shown in FIG. 13b closely matches the data shown in FIG. 13c, thus the clock drift present in the data has been significantly reduced.

As discussed above, the method of the invention is able to estimate the clock drift but this estimated clock drift can have superimposed on it a long wavelength trend understood to be caused by moveout. Removal of this trend may be achieved by de-trending as described above.

In the foregoing, much of the discussion has been discussed largely in terms of conventional seismic surveys, but that was done for purposes of illustration only and not out of an intent to limit the application of the instant disclosure to only those sorts of surveys. Those of ordinary skill in the art will understand how the embodiments presented supra could readily be applied, by way of example, to 2D, 3D, 4D, etc., surveys, down hole surveys, or any combination of same. Further, for purposes of the instant disclosure, when the term "source activation", "emission" or "shot" is used it should be interpreted to include both active (e.g., vibrators, dynamite, air gun(s), etc.) and passive sources.

Further, it should be noted that when the term "access" is used in connection with data acquired by a seismic survey that term should be understood to mean reading via a computer seismic data that is stored on a volatile or non-volatile medium. The seismic data acquired during a survey contains signals that are representative of the configuration of the earth proximate to the survey and may or may not have been previously treated with some number of computer algorithms to improve its usability at the time it is accessed. In the event that the term "access" is applied to synthetic or generated seismic data, that usage should be understood to mean that the data so-accessed has been created based on the interaction of computer algorithms that are programmed to utilize the physics of transmission, reflection, diffraction, etc., with a hypothetical model of the earth proximate to some area of interest.

Additionally, when it is said that processed or unprocessed seismic data might be used in seismic exploration, that act should be broadly interpreted to mean that seismic data (fully processed, minimally processed, or unprocessed) are used to provide images, plots, reports, or other visualizations that are representative of the configuration or properties of the subsurface of the earth. In other words, the seismic source has created seismic waves that are transmitted into and through the subsurface. Passage of the seismic waves through the subsurface modifies them depending on the properties of the media through which they pass. The recorded seismic waves are further transformed from P waves and/or S waves into electrical impulses that are recorded in the field. Subsequent seismic processing further transforms the electrical signals into the images, plots, reports, etc., that are used to make exploration or production drilling decisions or other sorts of decisions with real-world impact.

When it is said herein that a procedure or step is expressed in terms of or utilizes an "algorithm", that term should be understood to mean that the identified procedure or step (e.g., a "migration algorithm") is to be performed by software running within a computer, with the output from such algorithm being based on the value of one or more user or programmer specified parameters.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, this disclosure is not limited to those diagrams or to the corresponding descriptions. For example, flow need not move through each illustrated box or state, or in exactly the same order as illustrated and described.

Methods disclosed herein may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which this disclosure belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

While the inventive device has been described and illustrated herein by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

In aspects of the invention, a method of seismic exploration of a region of the subsurface of the earth containing structural or stratigraphic features conducive to the presence, migration, or accumulation of hydrocarbons, wherein is provided a seismic survey conducted proximate to the region of the subsurface of the earth, the method comprising the steps of:

(a) identifying a plurality of seismic traces that record a same source activation;

(b) selecting a first trace from among said plurality of seismic traces, said first trace being recorded by a first receiver having a first receiver clock integral thereto;

(c) selecting a second seismic trace, said second seismic trace being recorded by a second receiver having a second receiver clock integral thereto, wherein said second receiver is proximate to said first receiver;

(d) calculating a cross correlation between said first and second seismic traces;

(e) using said calculated cross correlation to determine a relative time shift between said first and said second seismic traces;

(f) performing steps (b) through (e) for a plurality of different first seismic traces and second seismic traces in said plurality of seismic traces;

(g) performing steps (a) through (f) for at least two different source activations, thereby producing a plurality of relative time shifts between each of said selected first traces and said second seismic traces;

(h) inverting said plurality of relative time shifts to obtain a clock drift estimate for each of said first and second receiver clocks;

(i) using said clock drift estimate to time correct each of said selected first and second seismic traces, thereby forming a plurality of time-corrected seismic traces representative of the subsurface of the earth.

The method may further comprise the steps of (j) using said plurality of time-corrected seismic traces to image at least a portion of said region of the subsurface of the earth; and, (k) using said imaged at least a portion of the subsurface of the earth in exploration for hydrocarbons within the region of the subsurface of the earth.

In another aspect of the invention, in a method of seismic exploration of a region of the subsurface of the earth containing structural or stratigraphic features conducive to the presence, migration, or accumulation of hydrocarbons, a plurality of shot gathers are provided, said shot gathers comprised of seismic traces collected in a seismic survey conducted proximate to the region of the subsurface of the earth, the method comprising the steps of:

(a) selecting a shot gather;

(b) selecting a pair of seismic traces within said shot gather, said pair of seismic traces being chosen such that said seismic traces in said pair are proximate to each other;

(c) determining a relative time shift between said selected pair of seismic traces;

(d) performing steps (b) and (c) for each least two different pairs of seismic traces;

(e) performing steps (a) through (d) for at least two different shot gathers;

(f) inverting any relative time shifts so-determined to obtain a clock drift estimate for each seismic trace selected as one of said selected pair of seismic traces in step (b);

(g) using said clock drift estimates to time correct each trace in said selected pair of seismic traces;

(h) using said time-corrected seismic traces to image at least a portion of said region of the subsurface of the earth; and, (i) using said imaged at least a portion of the subsurface of the earth in exploration for hydrocarbons within the region of the subsurface of the earth.

What is claimed is:

1. A method for use in seismic exploration of a region of a subsurface of Earth, comprising:

(a) identifying a plurality of proximate trace pairs from a plurality of continuously recorded seismic traces collected in a seismic survey conducted proximate to the region of the subsurface of the Earth, each of said traces being recorded by a receiver having a clock, each proximate trace pair comprising a first trace recorded by a first receiver and a second trace recorded by a second receiver proximate to the first receiver;

(b) for each of the proximate trace pairs, determining a relative time shift between the first trace and the second trace;

(c) inverting the relative time shifts determined in step (b) to obtain a clock drift estimate for each clock of the first and second receivers by solving the equation:

$$\begin{bmatrix} 1 & -1 & \ldots & 0 & 0 \\ 1 & 0 & -1 & \ldots & 0 \\ \vdots & & & & \vdots \\ 0 & 0 & \ldots & 1 & -1 \end{bmatrix} \begin{bmatrix} \Delta t_1 \\ \Delta t_2 \\ \vdots \\ \Delta t_N \end{bmatrix} = \begin{bmatrix} \Delta_{1,2} \\ \Delta_{1,3} \\ \vdots \\ \Delta_{N-1,N} \end{bmatrix}$$

for $\Delta t_i$, i=1, N, where $\Delta t_j$ is the clock drift estimate associated with an ith one of the clocks of the first and second receivers, where N is a number of the clocks of the first and second receivers, and where $\Delta_k$ is the relative time shift between a kth one of the first traces and a jth one of the second traces; and (d) using the clock drift estimates obtained in step (c) to time correct the first and second traces of each proximate trace pair, thereby forming a plurality of time-corrected seismic traces representative of the subsurface of the Earth.

2. The method according to claim 1, wherein step (a) comprises the steps of:

(a1) identifying a plurality of proximate trace pairs, each proximate trace pair comprising a first trace recorded by a first receiver and a second trace recorded by a second receiver proximate to the first receiver;

(a2) for the clock in each of the first and second receivers, selecting a shooting time window;

(a3) calculating a linear estimate of a drift correction for each of the clocks during the shooting time window; and (a4) adjusting the first and second traces in time according to the calculated linear estimate of the drift correction for the corresponding clock.

3. The method according to claim 1, further comprising identifying at least two trace sections for each of the first and second traces, and performing steps (a) to (d) separately for each of the trace sections, thereby forming a plurality of time-corrected traces representative of the subsurface of the Earth wherein each time-corrected trace comprises at least two sections of time-corrected trace corrected using the clock drift estimate obtained for the respective section of trace.

4. The method according to claim 1, wherein the relative time shift between the first trace and the second trace is determined in step (b) by determining the relative time shifts between a plurality of shot records comprised in the first trace and corresponding shot records in the second trace, and determining the average of the relative time shifts between the corresponding shot records.

5. The method according to claim 1, further comprising the step of, for each proximate trace pair, applying a kinematic correction to remove the effect of differential arrival times between the first and second receivers associated with the proximate trace pair.

6. The method according to claim 5, wherein the kinematic correction is an NMO correction or an LMO correction.

7. The method according to claim 1, wherein determining the relative time shift in step (b) comprises calculating a cross-correlation between the first and second traces.

8. The method according to claim 1, whereby at least one of the receivers has a clock which is an accurate clock, and wherein step (c) further comprises setting the clock drift estimate associated with the accurate clock to zero in the equation.

9. The method according to claim 1, wherein the proximate trace pairs are identified in step (a) such that each proximate trace pair is associated with at least one other proximate trace pair.

10. The method according to claim 1, further comprising the steps of (e) using the plurality of time-corrected seismic traces to image at least a portion of said region of the subsurface of the Earth; and (f) using the imaged region of the subsurface of the Earth in exploration for hydrocarbons within the region of the subsurface of the Earth.

11. The method of claim 1, wherein step (c) further comprises identifying a trend in the clock drift estimates for each of the clocks of the first and second receivers and removing the trend from the clock drift estimates, thereby forming de-trended clock drift estimates for each of the clocks of the first and second receivers;

and wherein step (d) comprises using the de-trended clock drift estimates obtained in step (c) to time correct the first and second traces of each proximate trace pair, thereby forming a plurality of time-corrected seismic traces representative of the subsurface of the Earth.

12. A method of seismic exploration of a region of a subsurface of Earth, comprising:

(a) accessing a plurality of time-corrected traces created by a method comprising the steps of:

(i) identifying a plurality of proximate trace pairs from a plurality of continuously recorded seismic traces collected in a seismic survey conducted proximate to the region of the subsurface of the Earth, each of said traces being recorded by a receiver having a, each proximate trace pair comprising a first trace recorded by a first receiver and a second trace recorded by a second receiver proximate to the first receiver, wherein the second receiver is proximate to the first receiver if the second receiver records signals from the same seismic event:

(ii) for each of the proximate trace pairs, determining a relative time shift between the first trace and the second trace;

(iii) inverting the relative time shifts determined in step (ii) to obtain a clock drift estimate for the clocks of the first and second receivers by solving the equation;

$$\begin{bmatrix} 1 & -1 & \ldots & 0 & 0 \\ 1 & 0 & -1 & \ldots & 0 \\ \vdots & & & & \vdots \\ 0 & 0 & \ldots & 1 & -1 \end{bmatrix} \begin{bmatrix} \Delta t_1 \\ \Delta t_2 \\ \vdots \\ \Delta t_N \end{bmatrix} = \begin{bmatrix} \Delta_{1,2} \\ \Delta_{1,3} \\ \vdots \\ \Delta_{N-1,N} \end{bmatrix}$$

for $\Delta t_i$, i=1, N, where $\Delta t_i$ is the clock drift estimate associated with an ith one of the clocks of the first and second receivers, where N is a number of the clocks of the first and second receivers, and where $\Delta_{k,j}$ is the relative time shift between a kth one of the first traces and jth one of the second traces; and (iv) using the clock drift estimates obtained in step (iii) to time correct the first and second traces of each proximate trace pair, thereby forming a plurality of time-corrected seismic traces representative of the subsurface of the Earth;

(b) using the accessed time-corrected seismic traces to image at least a portion of said region of the subsurface of the Earth; and (c) using the imaged at least a portion of the subsurface of the Earth in exploration for hydrocarbons within the region of the subsurface of the Earth.

13. The method according to claim 12, wherein step (i) comprises the steps of:

(a1) identifying a plurality of proximate trace pairs, each proximate trace pair comprising a first trace recorded by a first receiver and a second trace recorded by a second receiver proximate to the first receiver;

(a2) for the clock in each of the first and second receivers, selecting a shooting time window;

(a3) calculating a linear estimate of a drift correction for each of the clocks during the shooting time window; and (a4) adjusting the first and second traces in time according to the calculated linear estimate of the drift correction for the corresponding clock.

14. The method according to claim 12, further comprising identifying at least two trace sections for each of the first and second traces, and performing steps (i) to (iv) separately for each of the trace sections.

15. The method according to claim 12, wherein the relative time shift between the first trace and the second trace is determined by determining the relative time shifts between a plurality of shot records.

16. The method according to claim 12, further comprising the step of, for each proximate trace pair, applying a kinematic correction to remove the effect of differential arrival times between the first and second receivers.

17. The method according to claim 12, wherein the kinematic correction is an NMO correction or an LMO correction.

18. The method according to claim 12, wherein determining the relative time shift comprises calculating a cross-correlation between the first and second traces.

19. The method according to claim 12, whereby at least one of the receivers has a clock which is an accurate clock.

* * * * *